UNITED STATES PATENT OFFICE.

THEODORE CHRISTIAN FRYE AND CARL EDWARD MAGNUSSON, OF SEATTLE, WASHINGTON.

PROCESS OF PREPARING SEAWEEDS FOR FOOD.

965,382. Specification of Letters Patent. Patented July 26, 1910.

No Drawing. Application filed May 26, 1906. Serial No. 318,877.

*To all whom it may concern:*

Be it known that we, THEODORE CHRISTIAN FRYE and CARL EDWARD MAGNUSSON, citizens of the United States, and both residing at University Station, in the city of Seattle, in the county of King, in the State of Washington, United States of America, have invented or discovered new and useful Processes of Preparing Seaweeds for food.

Our invention consists of processes by which useful and palatable food products are obtained by eliminating the unsavory and nauseating taste of the stalks and bulbs of the plants, *Nereocystis* and *Pelagophycus*, species of the marine *Algæ*, by chemical and physical processes and by the addition of certain ingredients.

The stalks and bulbs of the plants, *Nereocystis* and *Pelagophycus*, are cut into any desired form, either directly or after first paring. These plants in their natural state have an unsavory and nauseating taste, which unfits them for use as a food; if, however, the stalks and bulbs are subjected to the action of acetic acid ($C_2H_4O_2$), or solutions whose active principle is acetic acid, or to the action of any of the oxidizing agents, bleaching powder, chlorin gas or hydrogen peroxid ($H_2O_2$), then the unsavory and nauseating taste is destroyed and a valuable food product is produced.

In using acetic acid the stalks and bulbs of the plants, *Nereocystis* and *Pelagophycus* are placed in a closed vessel and covered with a dilute solution (about 4 per cent.) of acetic acid; the mixture is then heated and kept at boiling point for about fifteen minutes; the weaker the acid the longer it needs to be boiled and the tougher the resulting product. The acetic acid is then removed from the treated stalks and bulbs by soaking in water; where acetic acid has been used heretofore in the preparation of food it has remained with the food and is eaten with it, and the foods were edible and useful before treatment, but in this case the substance treated is non-edible and useless, but by and through the process indicated and the removal of the acid the nauseating taste of the substance is completely destroyed but without decomposing the fiber or form of the plants, its color changed somewhat, and the resulting substance which is in form unchanged, is edible and useful and may be used in the making of a variety of other food products, such as preserves, jellies, marmalades, candied or sugared products by boiling in sugar and flavoring substances, and various kinds of pickles. It has been found that the action of the acetic acid is facilitated by first boiling the cut stalks and bulbs.

Having thus described our invention or discovery, what we claim as new and useful and desire to secure by Letters Patent of the United States, is:—

1. The process of eliminating or destroying the objectionable tastes in and belonging to the species of the marine *Algæ*, known as *Nereocystis* and *Pelagophycus* by exposing the same in a closed vessel to the action of dilute acetic acid ($C_2H_4O_2$) and heat for a definite time until the nauseating and unsavory taste is substantially removed, and subjecting the product to the action of water to remove the chemical.

2. The process of desavoring the plants of the marine *Algæ*, known as *Nereocystis* and *Pelagophycus* by boiling the same in dilute acetic acid ($C_2H_4O_2$), washing the mixture to remove the acid, and then preserving the same by boiling in sugar and a flavoring substance.

Signed:

THEODORE CHRISTIAN FRYE.
CARL EDWARD MAGNUSSON.

Witnesses:
HERBERT D. CARRINGTON,
M. E. BERRIDGE.